United States Patent
Pieper et al.

(10) Patent No.: US 8,874,355 B2
(45) Date of Patent: *Oct. 28, 2014

(54) METHOD AND SYSTEM FOR DYNAMICALLY POSITIONING A VEHICLE RELATIVE TO ANOTHER VEHICLE IN MOTION

(71) Applicant: Jaybridge Robotics, Inc., Cambridge, MA (US)

(72) Inventors: Joshua J. Pieper, Somerville, MA (US); Jeremy H. Brown, Somerville, MA (US)

(73) Assignee: Jaybridge Robotics, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/026,549

(22) Filed: Sep. 13, 2013

(65) Prior Publication Data

US 2014/0012489 A1 Jan. 9, 2014

Related U.S. Application Data

(62) Division of application No. 13/281,012, filed on Oct. 25, 2011, now Pat. No. 8,589,013.

(51) Int. Cl.
| | |
|---|---|
| *G08G 7/00* | (2006.01) |
| *G08G 1/16* | (2006.01) |
| *G05D 1/02* | (2006.01) |
| G08G 1/0967 | (2006.01) |

(52) U.S. Cl.
CPC .......... *G08G 1/166* (2013.01); *G08G 1/096775* (2013.01); *G05D 1/0214* (2013.01); *G05D 1/027* (2013.01); *G05D 1/0274* (2013.01); *G05D 1/0278* (2013.01); *G05D 1/0291* (2013.01); *G05D 2201/0201* (2013.01)
USPC ........................................... 701/117; 701/422

(58) Field of Classification Search
CPC ................................................ G08G 1/096775
USPC ................................................... 701/117, 422
See application file for complete search history.

(56) References Cited

U.S. PATENT DOCUMENTS

| | | | |
|---|---|---|---|
| 3,429,062 A | 2/1969 | Nelson | |
| 3,889,796 A | 6/1975 | Baily et al. | |
| 5,204,814 A | 4/1993 | Noonan et al. | |
| 5,684,476 A | 11/1997 | Anderson | |
| 5,987,383 A | 11/1999 | Keller et al. | |
| 6,076,025 A | 6/2000 | Ueno et al. | |
| 6,088,644 A | 7/2000 | Brandt et al. | |
| 6,141,614 A | 10/2000 | Janzen et al. | |
| 6,151,539 A | 11/2000 | Bergholz et al. | |
| 6,205,381 B1 | 3/2001 | Motz et al. | |

(Continued)

*Primary Examiner* — Calvin Cheung

(74) *Attorney, Agent, or Firm* — Rajesh Vallabh; Foley Hoag LLP

(57) ABSTRACT

A computer-implemented method is provided for automatically guiding a first vehicle to maintain a position relative to a second vehicle traveling in a given area. The method includes the steps of: (a) receiving location data on the first and second vehicles; (b) determining a legal travel path in the given area from the first vehicle toward an expected position of the second vehicle; (c) automatically controlling the first vehicle to travel along the legal travel path; and (d) repeating steps (a) through (c) to automatically move the first vehicle to a relative position from the second vehicle and then to automatically maintain the relative position as the first and second vehicles travel through the given area.

18 Claims, 6 Drawing Sheets

(56) References Cited

U.S. PATENT DOCUMENTS

| | | |
|---|---|---|
| 6,377,889 B1 | 4/2002 | Soest |
| 6,431,576 B1 | 8/2002 | Viaud et al. |
| 6,434,462 B1 | 8/2002 | Bevly et al. |
| 6,501,422 B1 | 12/2002 | Nichols |
| 6,539,303 B2 | 3/2003 | McClure et al. |
| 6,615,108 B1 | 9/2003 | Peless et al. |
| 6,643,576 B1 | 11/2003 | O Connor et al. |
| 6,703,973 B1 | 3/2004 | Nichols |
| 6,804,587 B1 | 10/2004 | O Connor et al. |
| 6,804,597 B1 | 10/2004 | Posselius et al. |
| 6,865,465 B2 | 3/2005 | McClure |
| 6,885,912 B2 | 4/2005 | Peless et al. |
| 6,907,336 B2 | 6/2005 | Gray et al. |
| 6,990,399 B2 | 1/2006 | Hrazdera et al. |
| 7,010,425 B2 | 3/2006 | Gray et al. |
| 7,054,731 B1 | 5/2006 | Lange et al. |
| 7,100,725 B2 | 9/2006 | Thorne |
| 7,142,956 B2 | 11/2006 | Heiniger et al. |
| 7,155,309 B2 | 12/2006 | Peless et al. |
| 7,162,348 B2 | 1/2007 | McClure et al. |
| 7,173,391 B2 | 2/2007 | Jones et al. |
| 7,188,015 B2 | 3/2007 | Lange et al. |
| 7,191,061 B2 | 3/2007 | McKay et al. |
| 7,228,214 B2 | 6/2007 | Flann et al. |
| 7,256,388 B2 | 8/2007 | Eglington et al. |
| 7,263,422 B2 | 8/2007 | Lange et al. |
| 7,317,977 B2 | 1/2008 | Matrosov |
| 7,349,759 B2 | 3/2008 | Peless et al. |
| 7,350,343 B2 | 4/2008 | Beck |
| 7,363,154 B2 | 4/2008 | Lindores |
| 7,373,231 B2 | 5/2008 | McClure et al. |
| 7,383,114 B1 | 6/2008 | Lange et al. |
| 7,388,343 B2 | 6/2008 | Jones et al. |
| 7,429,843 B2 | 9/2008 | Jones et al. |
| 7,431,115 B2 | 10/2008 | Thorne |
| 7,437,230 B2 | 10/2008 | McClure et al. |
| 7,451,030 B2 | 11/2008 | Eglington et al. |
| 7,490,678 B2 | 2/2009 | Unruh et al. |
| 7,502,678 B2 | 3/2009 | Diekhans et al. |
| 7,509,199 B2 | 3/2009 | Rekow |
| 7,580,783 B2 | 8/2009 | Dix |
| 7,593,798 B2 | 9/2009 | Han et al. |
| 7,623,952 B2 | 11/2009 | Unruh et al. |
| 7,689,354 B2 | 3/2010 | Heiniger et al. |
| 7,689,356 B2 | 3/2010 | Dix et al. |
| 7,693,653 B2 | 4/2010 | Hussain et al. |
| 7,706,948 B2 | 4/2010 | Dix et al. |
| 7,715,966 B2 | 5/2010 | Dix et al. |
| 7,715,979 B2 | 5/2010 | Dix |
| 7,729,834 B2 | 6/2010 | Meyer Zu Helligen et al. |
| 7,734,387 B1 | 6/2010 | Young et al. |
| 7,737,878 B2 | 6/2010 | van Tooren et al. |
| 7,742,860 B2 | 6/2010 | Diekhans et al. |
| 7,747,370 B2 | 6/2010 | Dix |
| 7,756,624 B2 | 7/2010 | Diekhans et al. |
| 7,818,120 B2 | 10/2010 | Poreda et al. |
| 7,835,832 B2 | 11/2010 | Macdonald et al. |
| 7,844,378 B2 | 11/2010 | Lange |
| 7,844,380 B2 | 11/2010 | Han et al. |
| 7,860,628 B2 | 12/2010 | Lange |
| 7,873,437 B2 | 1/2011 | Aldred et al. |
| 7,877,182 B2 | 1/2011 | Dix et al. |
| 8,132,659 B2 | 3/2012 | Coers et al. |
| 8,186,497 B2 | 5/2012 | Mackin et al. |
| 2005/0053451 A1* | 3/2005 | Gagnon et al. .............. 414/400 |
| 2006/0156703 A1* | 7/2006 | Dillon ............................ 56/14.9 |
| 2006/0175541 A1 | 8/2006 | Eglington et al. |
| 2006/0178820 A1 | 8/2006 | Eglington et al. |
| 2006/0178823 A1 | 8/2006 | Eglington et al. |
| 2006/0178825 A1 | 8/2006 | Eglington et al. |
| 2007/0233374 A1 | 10/2007 | Diekhans et al. |
| 2008/0009985 A1* | 1/2008 | Plishner ......................... 701/23 |
| 2008/0167817 A1* | 7/2008 | Hessler et al. ................ 701/223 |
| 2008/0306628 A1 | 12/2008 | Ng-Thow-Hing et al. |
| 2009/0228166 A1* | 9/2009 | Durkos et al. .................. 701/26 |
| 2010/0066517 A1 | 3/2010 | Posselius et al. |
| 2010/0174435 A1 | 7/2010 | Lim |
| 2010/0274452 A1 | 10/2010 | Ringwald et al. |
| 2010/0292835 A1 | 11/2010 | Sugiura et al. |
| 2011/0035050 A1 | 2/2011 | Kim et al. |
| 2011/0035051 A1 | 2/2011 | Kim et al. |
| 2012/0096824 A1 | 4/2012 | Burger |
| 2012/0302299 A1 | 11/2012 | Behnke et al. |

\* cited by examiner

METHOD AND SYSTEM FOR DYNAMICALLY POSITIONING A VEHICLE RELATIVE TO ANOTHER VEHICLE IN MOTION

CROSS RELATED TO RELATED APPLICATION

This application is a divisional of and claims priority to U.S. patent application Ser. No. 13/281,012 filed on Oct. 25, 2011 entitled METHOD AND SYSTEM FOR DYNAMICALLY POSITIONING A VEHICLE RELATIVE TO ANOTHER VEHICLE IN MOTION, which is hereby incorporated by reference.

BACKGROUND

The present application relates generally to automatically driven vehicles and, more particularly, to a method and system for automatically driving and dynamically positioning a vehicle relative to another in motion.

BRIEF SUMMARY OF THE DISCLOSURE

In accordance with one or more embodiments, a computer-implemented method is provided for automatically guiding a first vehicle to maintain a position relative to a second vehicle traveling in a given area. The method includes the steps of: (a) receiving location data on the first and second vehicles; (b) determining a legal travel path in the given area from the first vehicle toward an expected position of the second vehicle; (c) automatically controlling the first vehicle to travel along the legal travel path; and (d) repeating steps (a) through (c) to automatically move the first vehicle to a relative position from the second vehicle and then to automatically maintain the relative position as the first and second vehicles travel through the given area.

In accordance with one or more further embodiments, a first vehicle is provided that is configured to automatically maintain a position relative to a second vehicle traveling in a given area. The first vehicle includes a vehicle drive system, an obstacle detection system for detecting obstacles in a vehicle travel path, a vehicle state property estimation system for estimating state properties of the vehicle, and a microprocessor-based vehicle controller receiving data from the obstacle detection system and the vehicle state property estimation system. The vehicle controller is configured to: (i) receive location data on the first vehicle from the vehicle state property estimation system, and to receive location data on the second vehicle; (ii) determine a legal travel path in the given area from the first vehicle toward an expected position of the second vehicle; (iii) automatically control the vehicle drive system to drive the first vehicle along the legal travel path; and (iv) repeat (i) through (iii) to automatically move the first vehicle to a relative position from the second vehicle and then to automatically maintain the relative position as the first and second vehicles travel through the given area.

BRIEF DESCRIPTION OF THE DRAWINGS

Like or identical reference numbers are used to identify common or similar elements.

DETAILED DESCRIPTION

Various embodiments disclosed herein are directed to methods and systems for automatically driving and dynamically positioning a vehicle (referred to herein as a "first" vehicle) relative to another vehicle (referred to herein as a "second" vehicle). In some embodiments, the first vehicle is towing a conveyance, and it is controlled such that the conveyance is positioned accurately relative to the second vehicle, while the second vehicle is in motion. In some embodiments, the first vehicle is controlled to move between a designated parking area and a position relative to the second vehicle.

Figure 1:
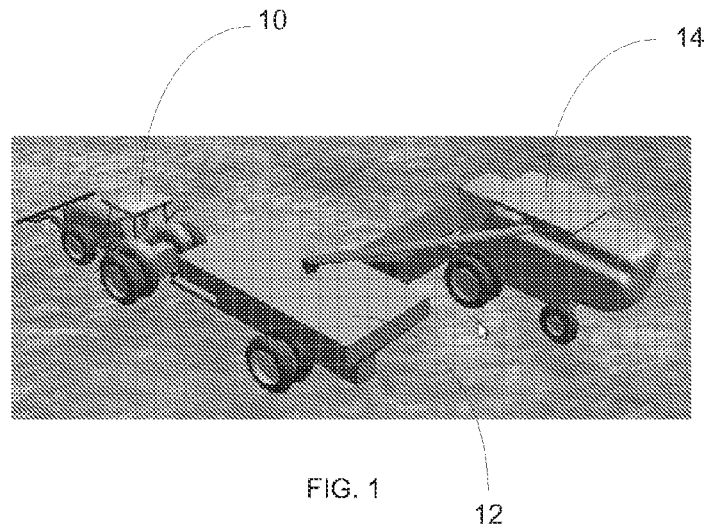
FIG. 1 is an illustration showing an exemplary tractor maintaining a relative position from a harvester in accordance with one or more embodiments.

Such methods and systems can have a variety of applications including, e.g., agricultural applications. By way of example, as shown in FIG. 1, the first vehicle is an automatically driven tractor 10, the towed conveyance is a grain cart 12, and the second vehicle is a harvester 14. The parking area contains a semi truck into which the grain cart 12 is offloaded after having been filled. In this example, the harvester 14 offloads harvested corn, soy, or other product into the grain cart 12 as the grain cart 12 is towed alongside the harvester 14 by the tractor 10. When the grain cart 12 is filled, the tractor 10 tows it to the parking area to be offloaded into the semi truck. When the grain cart 12 is empty, the tractor 10 tows it back out to the harvester 14, which has remained in motion, to begin taking offloaded product again.

For simplicity, various exemplary embodiments disclosed herein refer to the grain cart example. However, it should be understood that there are many other possible applications for the methods and systems described herein, including agricultural and non-agricultural applications. Other possible applications can include, but are not limited to, mining, oil and gas exploration, defense, first response, and materials handling.

The second vehicle 14, which the first vehicle 10 is controlled to be positioned relative thereto, can be operated in various ways, including by a human driver inside the vehicle. Alternately, the second vehicle 14 can be tele-operated (i.e., remotely operated) by a human outside the vehicle or it can be driven entirely automatically.

Various embodiments disclosed herein discuss the positioning of the towed conveyance 12 relative to the second vehicle 14. However, techniques disclosed herein are also applicable to the case where the second vehicle 14 is also towing a conveyance, and the dynamic positioning of the first conveyance is relative to the second conveyance. In some embodiments, the second vehicle 14 can tow a conveyance, and the dynamic positioning of the first vehicle 10 is relative to the conveyance of the second. In further embodiments, neither vehicle tows a conveyance, and the first vehicle 10 is controlled such that it is dynamically positioned relative to the second vehicle 14.

Figure 2:
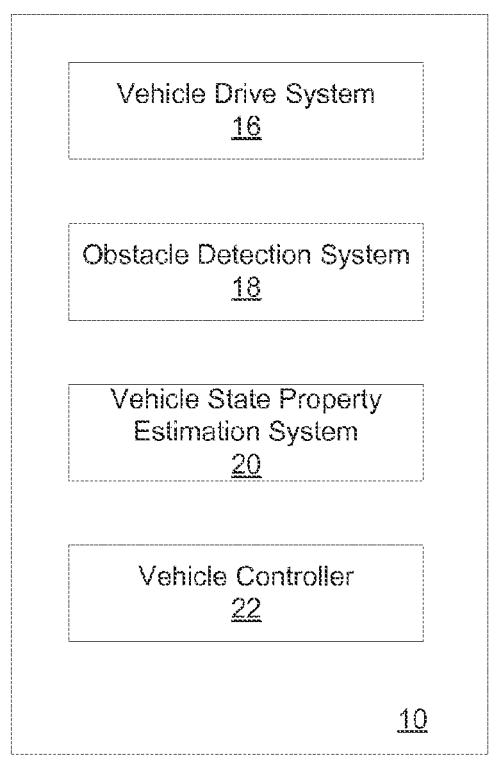
FIG. 2 is a simplified block diagram illustrating components of a first vehicle in accordance with one or more embodiments.

FIG. 2 is a simplified block diagram illustrating components of the automated first vehicle 10 in accordance with one or more embodiments. The first vehicle 10 includes a vehicle drive system 16 or chassis for moving the vehicle. The first vehicle 10 also includes an obstacle detection system 18 including one or more range sensors for detecting obstacles 36 (shown in FIG. 4) in the vehicle travel path. The first vehicle 10 also includes a vehicle state property estimation system 20 comprising one or more sensors for estimating state properties of the vehicle. It further includes a microprocessor-based vehicle controller 22, which receives inputs from the obstacle detection system 18 and the vehicle state property estimation system. The vehicle controller 22 also receives data on estimated state properties from the second vehicle 14. The vehicle controller 22 controls operation of the drive system 16 and is programmed to maneuver the vehicle in a desired manner, including dynamically positioning the first vehicle 10 relative to the second vehicle 14.

In various exemplary embodiments described herein, the vehicle controller 22 is physically located within the body of the first vehicle 10. It should be understood, however, that in other embodiments, the vehicle controller 22, or portions of the controller, could be located outside of the first vehicle 10. Such separation of physical location of the electronics and software for controlling the first vehicle 10 is contemplated herein. Moreover, while in the exemplary embodiments discussed herein indicate information is sent to or from the first vehicle 10, that is intended to mean information sent to or from the vehicle controller 22, wherever it may be physically located.

Determining Vehicle Positions

Figure 3:
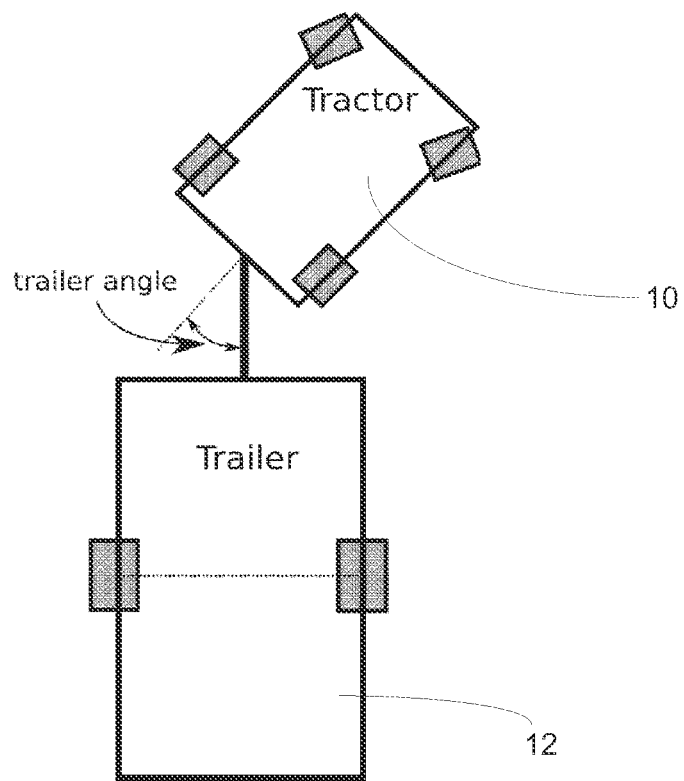
FIG. 3 is a simplified illustration showing the trailer angle between the tractor and a conveyance.

The vehicle state property estimation system 20 in the first vehicle 10 estimates several state properties of the vehicle from one or more sensors. Similarly, the second vehicle 14 includes a vehicle state property estimation system to estimate several state properties of that vehicle. State variables estimated for both vehicles include absolute position in some Earth-relative navigation system (e.g., latitude and longitude), speed, heading, and yaw rate (i.e., rate of change of heading). For the first vehicle 10, the angle between the vehicle 10 and any towed conveyance 12 (e.g., between the tractor 10 and the grain cart 12 as illustrated in FIG. 3) is also estimated.

By way of example, a set of sensors for forward motion comprise a Global Positioning System (GPS) device with Real Time Kinematic (RTK) correction, which provide position and, when a vehicle is in motion, heading. The set of sensors can further include an inertial measurement unit (IMU), which provides measurements of linear acceleration and rotational velocity. The set of sensors can also include sensors for odometry measurements of the tractor's wheels and steering angle. Other combinations of sensors are also possible for forward motion.

To enable reverse motion of a vehicle 10 with a towed conveyance 12 on a hinged hitch, an additional sensor is used, which directly or indirectly measures the angle between the vehicle 10 and the conveyance 12. This additional sensor is used because reverse motion is generally unstable, and dynamic control techniques are performed using the sensor input.

By way of example, the desired state values can be estimated from the sensor data using an Unscented Kalman Filter (UKF), whose inputs are the sensor measurements and whose outputs are the state variables. Other state estimation methods could also be employed.

Both vehicles need not use the same set of sensors. For instance, the harvester 14 could use the global, earth-relative sensors described above, while the tractor 10 could use sensors that directly ascertain its position relative to the harvester 14 in some local reference frame.

Relative positioning is the responsibility of the automatic tractor 10. Thus, the state estimates of the harvester 14 are continuously sent electronically to the tractor 10 to facilitate positioning.

Legal Travel Areas

Figure 4:
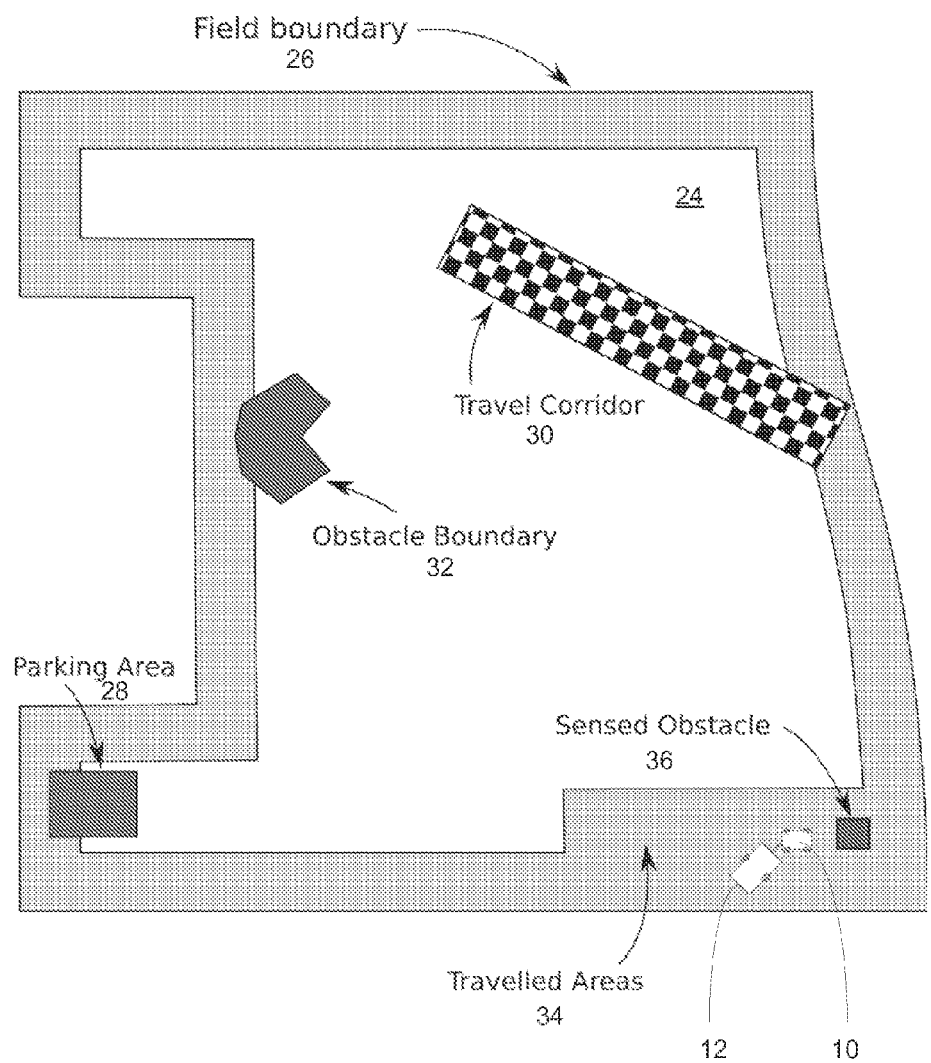
FIG. 4 is a simplified diagram illustrating an exemplary field in which an automated tractor can operate.

FIG. 4 is a simplified illustration of an exemplary field 24 on which the tractor 10 and harvester 14 can operate. The field 24 is defined by a field boundary 26. The field 24 includes legal travel areas within the field boundary 26. The tractor 10 is allowed to travel only in the legal travel areas.

Legal travel areas can include a designated parking area 28. The system operator may designate zero or more geographic regions of arbitrary shape to be parking areas.

Legal travel areas can also include designated travel corridors 30. The system operator can designate zero or more geographic regions of arbitrary shape to be travel corridors.

Legal travel areas can also include previously traveled areas. If the second vehicle 14 travels over an area, that area is by default deemed to be a legal travel area. For instance, a harvester 14 harvests the crop and leaves a cleared area behind it. The harvester 14 regularly transmits newly-cleared path information to the tractor controller 22 so that the tractor 10 has an accurate representation of the harvested areas.

The field boundary 26 can be designated by the system operator as an arbitrary boundary around the operating area. No area outside of that boundary can be a legal travel area.

The system operator can also designate an arbitrary boundary 32 around zero or more obstacles. No area inside any obstacle boundary 32 can be a legal travel area.

The obstacle detection system 18 in the first vehicle allows it to detect unanticipated obstacles 36 in the field 24. While an obstacle 36 is detected, it designates an obstacle boundary 32 around the obstacle. This area within the obstacle boundary 32 is not a legal travel area.

Long-distance Path Finding

When the second vehicle 14 is a sufficiently long distance away from the first vehicle (e.g., the tractor 10 is in a parking area 28 and the harvester 14 is operating in the field 24), a long-distance path finding procedure is used to determine a legal path for the first vehicle 10 to follow to be at a desired position relative to the second vehicle 14. A variety of algorithms and processes can be used for such long-distance path finding, including a standard A* or hybrid A* algorithm. The A* algorithms work from a discrete set of moves—that is, a discrete set of vehicle headings is considered at each step in the process.

The area available for the path planning algorithms to use is determined from both the pre-surveyed paths in the field 24 (e.g., designated parking areas 28, travel corridors 30, field boundaries 26, and obstacle boundaries 32) and area 34 that has been previously travelled by the harvester 14.

The algorithm for checking whether a path lies entirely inside legal travel areas can use a simplified polygon representation of the vehicle and the legal travel areas, and performs intersection-checking of the vehicle polygon with the various areas.

In accordance with one or more embodiments, to reduce the frequency with which the tractor 10 has to "stop to think," it runs a path planning algorithm tuned to run to conclusion quickly, but to give up relatively easily on any path. In order to find a path even in complex terrain, the tractor 10 simultaneously runs a copy of the path planning algorithm tuned to be very aggressive in trying to find a path. This ensures that if the quick path finder above fails, the tractor 10 can eventually think its way out of any solvable situation.

Operator Commands

Figure 5:
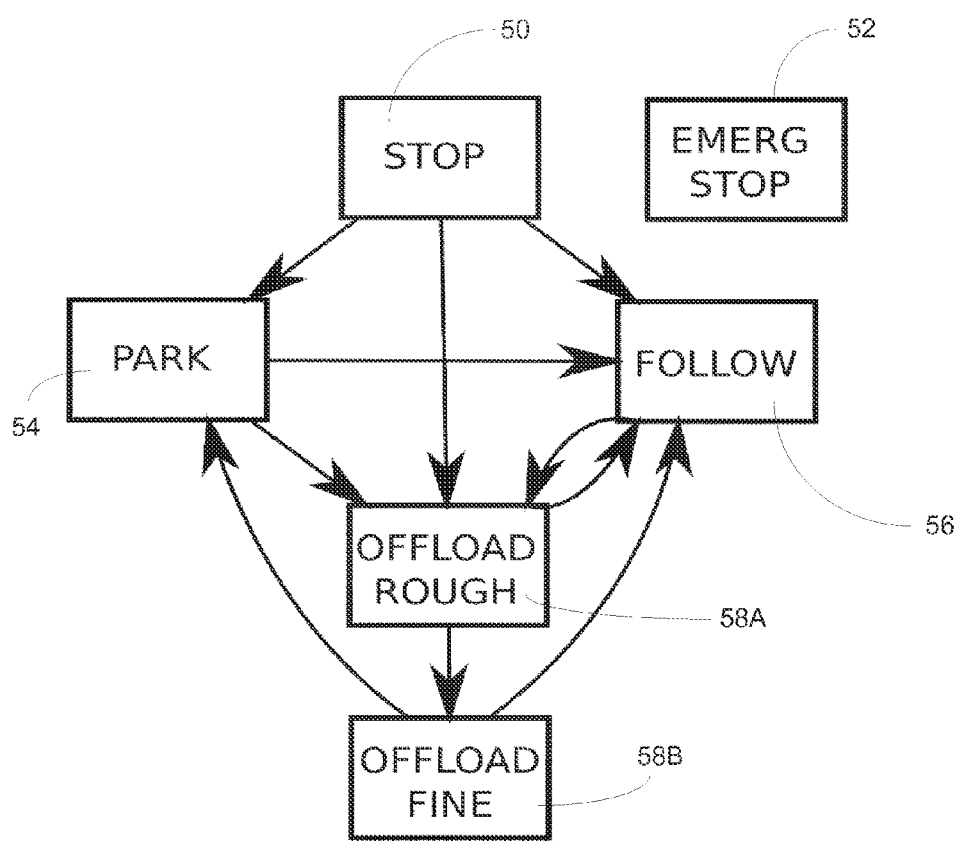
FIG. 5 is a simplified state diagram illustrating various states of the automated vehicle in accordance with one or more embodiments.

The system operator can issue various high-level commands (shown in FIG. 5) to the automatic tractor 10, including STOP 50, EMERGENCY STOP 52, PARK 54, FOLLOW 56, and OFFLOAD 58A, 58B. As shown in FIG. 5, any state can transition to STOP 50 or EMERGENCY STOP 52.

Upon receiving a STOP command 50, the tractor 10 will slow to a halt along its currently planned path. The manner of stopping is intended to be as quick as possible while remaining subjectively comfortable for any human occupant of the tractor 10.

When executing an EMERGENCY STOP operation 52, the tractor 10 will attempt to halt as quickly as possible, e.g., by fully engaging the brakes and fully disengaging the clutch. The manner of stopping is intended to be immediate, without regard to the subjective comfort of any human occupant of the tractor 10.

When executing a PARK operation 54, the tractor 10 will perform long-distance path finding to find a legal path to the designated parking area 28. If a path is found, the tractor 10 will travel using the long-distance path following process. If no path is found, the tractor 10 will perform a STOP operation 50, returning to active motion when a legal PARK path is discovered.

Upon receiving FOLLOW command 56, the tractor 10 will perform a FOLLOW operation to begin following the harvester 14 at a standoff distance. If the harvester 14 is not nearby when the operation starts, the tractor 10 will first transit from its current location to the harvester 14 via legal long-distance travel paths, using the long-distance path following process. If no legal path can be determined, the tractor 10 will begin a STOP operation 50, returning to active motion when a legal FOLLOW path is discovered.

As the harvester 14 moves, the tractor 10 creates new plans to the current harvester position. The plan is made from a point in the tractor's future path. If an updated plan is found successfully, the remainder of the current plan is replaced with the new plan. This update and re-plan procedure continues indefinitely while the tractor 10 is in FOLLOW mode 56.

Upon receiving an OFFLOAD command, the tractor 10 will perform an OFFLOAD operation 58A, 58B to take up a precisely-maintained position relative to the harvester 14 to support offload.

Figure 6:
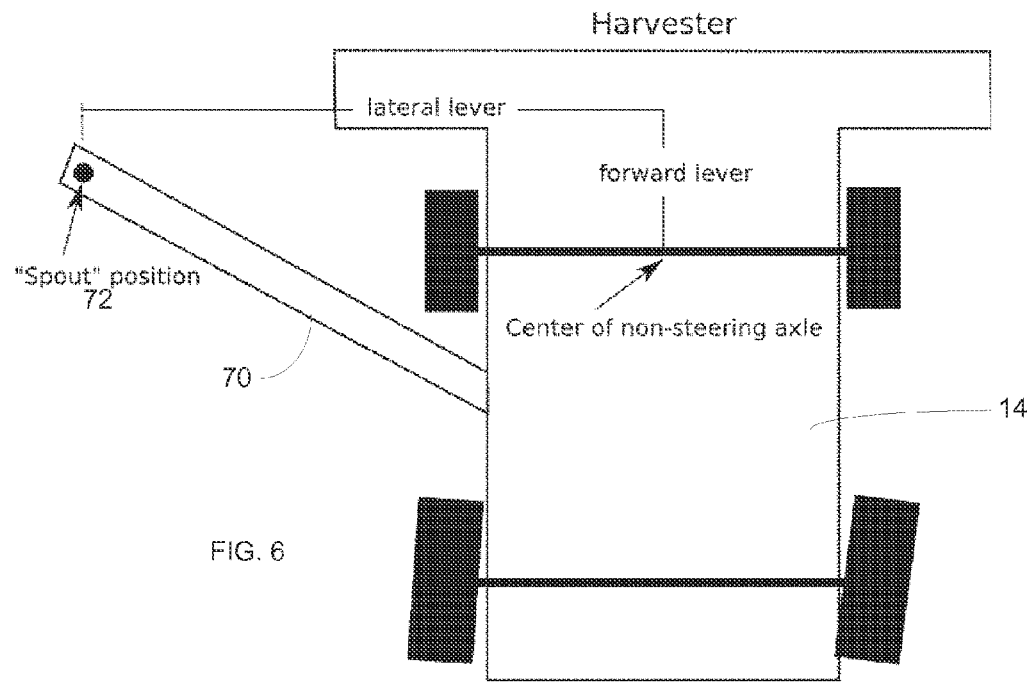
FIG. 6 is a simplified diagram illustrating a harvester.

The harvester 14 can include a lever arm 70 (shown in FIG. 6) for offloading material to the grain cart 12. The system operator identifies a position relative to the harvester 14, called the "lever arm position" or "spout position" 72 (shown in FIG. 6), and a position relative to the grain cart 12, called the "load position" 74 (shown in FIG. 7). During the OFFLOAD operation, the system endeavors to keep the two positions co-located.

The OFFLOAD process is comprised of two major steps. In the first step, ROUGH POSITIONING 58A, the automatic tractor 10 tows the trailer 12 into a "roughly correct" position using the long-distance path finding and long-distance path following processes to get near the harvester 14. If the tractor 10 cannot determine a legal path to an offload position, or if the tractor 10 is already in offload position, but the current legal path "dead ends," it will perform a FOLLOW operation 56 until such time as a legal offload path can be found.

The second step, FINE POSITIONING 58B, begins once the trailer 12 is in approximately the correct position, to bring it to the desired position, and to maintain that position, with the required accuracy. In this mode, the tractor 10 uses the state information received from the harvester 14 to estimate the arc that the lever arm position will trace out, assuming that the current harvester yaw rate remains constant. A standard control algorithm known as "pure pursuit" can be used to determine the path that the grain cart should traverse in order to keep the load position 74 co-located with the spout position 72.

Figure 8:
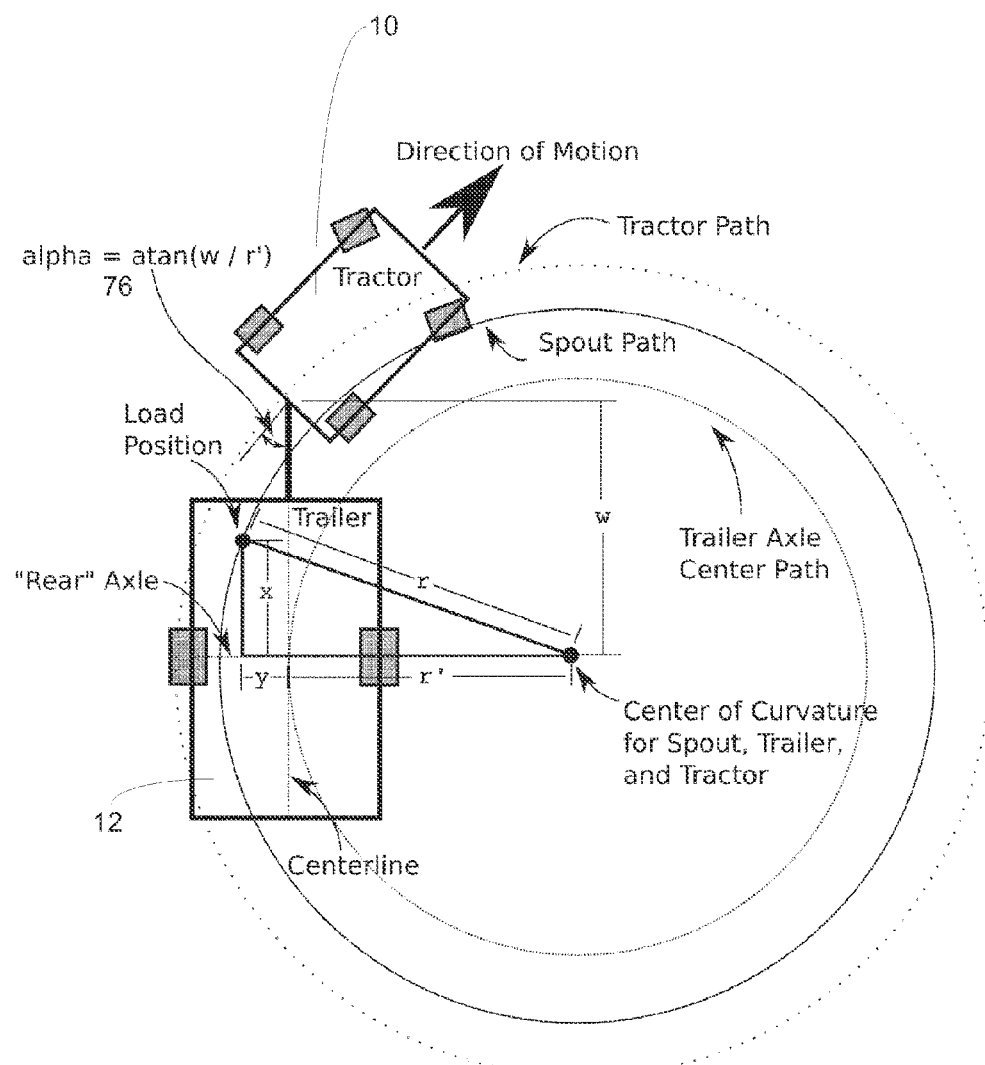
FIG. 8 is a simplified diagram illustrating calculation of the tractor path in accordance with one or more embodiments.

Given the grain cart's required path and current position, the angle alpha between the automatic tractor 10 and the grain cart 12 can be determined given simple models of each element. The automatic vehicle 10 is then steered to create the desired "alpha" 76 as shown in FIG. 8 using a standard PID controller integrated into the vehicle controller 22.

Offload Position Targeting

The harvester vehicle 14 may support more than one lever arm position. For example, a harvester 14 may support offloading to the right or to the left sides.

Figure 7:
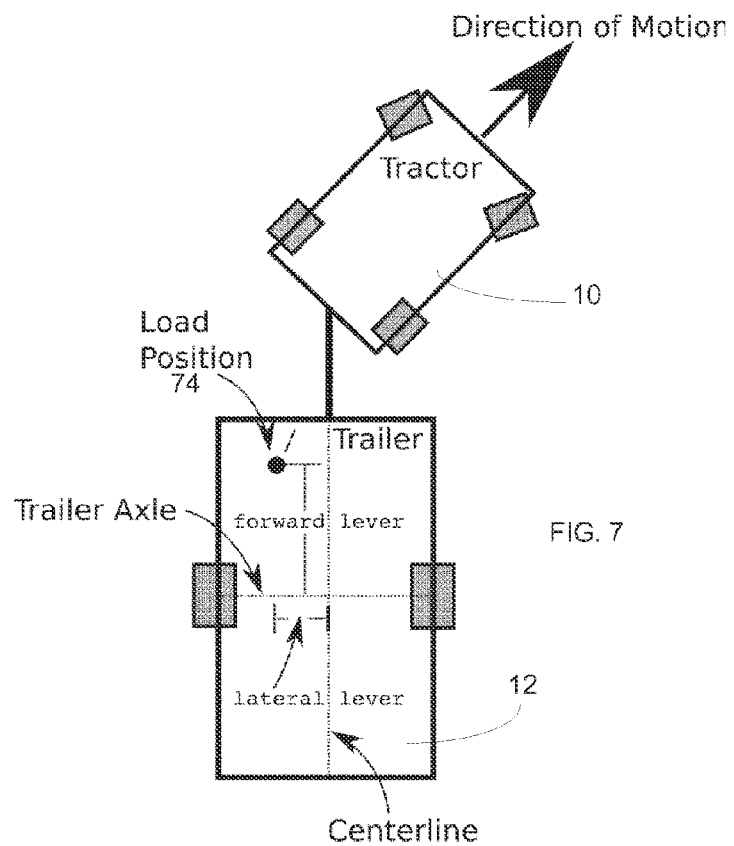
FIG. 7 is a simplified diagram illustrating varying load positions in a conveyance.

In some embodiments, the load position 74 can be deliberately varied (as shown in FIG. 7) during operation, e.g., in order to maintain even fill of a grain cart 12. The system operator may manually adjust the load position 74 during operations. The load position 74 may also optionally be set to automatically cycle from the front of the grain cart to the back. Furthermore, the use of sensors such as load sensors or content-height sensors affixed to the grain cart at various points can be used to automatically guide the loading position 74 along the axis of the grain cart 12 to provide more even loading.

The processes of the vehicle controller 22 described above may be implemented in software, hardware, firmware, or any combination thereof. The processes are preferably implemented in one or more computer programs executing on the vehicle controller 22. Each computer program can be a set of instructions (program code) in a code module resident in the random access memory of the controller 22. Until required by the controller 22, the set of instructions may be stored in another computer memory (e.g., in a hard disk drive, or in a removable memory such as an optical disk, external hard drive, memory card, or flash drive) or stored on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions.

Accordingly, the foregoing description and attached drawings are by way of example only, and are not intended to be limiting.

What is claimed is:

1. A computer-implemented method for automatically guiding a first vehicle to maintain a position relative to a second vehicle traveling in a given area, said first and second vehicles being independently driven and being unattached to each other, the method comprising the steps of:

(a) receiving location data on the first and second vehicles;

(b) determining a legal travel path for the first vehicle in the given area from the first vehicle toward an expected position of the second vehicle;

(c) automatically controlling the first vehicle to travel along the legal travel path; and (d) repeating steps (a) through (c) to automatically move the first vehicle progressively closer to the second vehicle until the first vehicle is at a given relative position from the second vehicle and then to automatically maintain the given relative position as the first and second vehicles travel through the given area.

2. The method of claim 1, wherein the location data on the first and second vehicles comprises estimated state properties of each vehicle based on data received from one or more sensors.

3. The method of claim 2, wherein the state properties comprise an absolute position in a shared reference frame, speed, heading, and yaw rate.

4. The method of claim 2, wherein the first vehicle tows a conveyance, and wherein the state properties include an estimation of an angle between the first vehicle and the towed conveyance.

5. The method of claim 2, wherein the one or more sensors comprise forward motion sensors including a Global Positioning System (GPS) sensor with Real Time Kinematic (RTK) correction, an inertial measurement unit (IMU), or an odometer.

6. The method of claim 1, wherein the first vehicle tows a conveyance, and wherein moving the first vehicle to a relative position from the second vehicle comprises co-locating a given offload position in the conveyance with a mechanism extending from the second vehicle.

7. The method of claim 6, wherein the first vehicle is a tractor and the conveyance is a cart, and wherein the second vehicle comprises a harvester and the mechanism comprises a lever arm for offloading harvested material from the harvester to the cart.

8. The method of claim 6, wherein the given offload position in the conveyance is varied to maintain a generally even fill of the conveyance.

9. The method of claim 8, wherein the given position in the conveyance is varied manually or automatically in accordance with a predetermined pattern or based on content-height sensor readings.

10. The method of claim 1, wherein the second vehicle tows a conveyance, and wherein moving the first vehicle to a relative position from the second vehicle comprises co-locating a given position in the conveyance with a mechanism extending from the first vehicle.

11. The method of claim 1, wherein the second vehicle is operated by a human driver inside the vehicle, tele-operated by human outside the vehicle, or automatically driven.

12. The method of claim 1, further comprising automatically driving the first vehicle to a parking area in response to receiving a park command.

13. The method of claim 1, further comprising automatically stopping the first vehicle in response to a stop command.

14. The method of claim 1, further comprising automatically driving the first vehicle to follow the second vehicle at a standoff distance in response to follow command.

15. The method of claim 1, wherein the method steps are implemented in a computerized vehicle controller, and wherein the controller is installed in the first vehicle or is installed in a location remote from the first vehicle and transmits control signals to a drive system in the vehicle.

16. The method of claim 1, wherein any portion of the given area previously traveled by the second vehicle is a legal travel area.

17. The method of claim 1, wherein the given area is defined by an outer boundary, and a legal travel path must be within the outer boundary.

18. The method of claim 1, wherein a legal travel path cannot extend through any portion of a predetermined obstacle boundary.

* * * * *